US006266859B1

(12) United States Patent
Hernandez

(10) Patent No.: US 6,266,859 B1
(45) Date of Patent: Jul. 31, 2001

(54) POWER STEERING PUMP PULLEY REMOVAL TOOL

(75) Inventor: Hector Ray Hernandez, Whittier, CA (US)

(73) Assignee: Alltrade Inc., Long Beach, CA (US)

( * ) Notice: Subject to any disclaimer, the term of this patent is extended or adjusted under 35 U.S.C. 154(b) by 0 days.

(21) Appl. No.: 09/477,260

(22) Filed: Jan. 4, 2000

(51) Int. Cl.[7] .................................................... B23D 19/04
(52) U.S. Cl. ................................ 29/256; 29/264; 29/259; 29/278
(58) Field of Search .............................. 29/256, 244, 259, 29/264, 278, 258

(56) References Cited

U.S. PATENT DOCUMENTS 2,562,419 * 7/1951 Ferris ..................................... 29/256
4,955,130 * 9/1990 Bricker et al. ....................... 29/213.1
5,119,556 * 6/1992 Hseu ...................................... 29/264
5,887,328 * 3/1999 Rydin et al. ........................... 29/259
5,894,650 * 4/1999 Barenburg .............................. 29/259
5,996,201 * 12/1999 Ringle ................................. 29/213.1

* cited by examiner

*Primary Examiner*—Joseph J. Hail, III
*Assistant Examiner*—Lee Wilson
(74) *Attorney, Agent, or Firm*—Robert R. Thornton

(57) ABSTRACT

A power steering pump pulley removal tool has a pair of jaws mounted by mounting fasteners on opposite faces of a hub which has a threaded passageway extending axially therethrough. The jaws are in longitudinal alignment with one another and the passageway and have complementary arcuate gripping elements formed thereon so as to be remote from the hub. A pair of laterally aligned grip-holding fasteners extend between the jaws adjacent their gripping elements and are operable to hold the jaws in a closed, pulley engaging position. The hub has a handle extending laterally therefrom. A complementarily threaded drive bolt is disposed in the hub passageway so as to have a power steering pump drive shaft engaging end adjacent the gripping elements and a drive end remote therefrom.

2 Claims, 3 Drawing Sheets

POWER STEERING PUMP PULLEY REMOVAL TOOL

FIELD OF THE INVENTION

The present invention relates to a power steering pump pulley removal tool for removing a pulley attached by a splined or non-splined drive shaft to a automotive power steering pump. More particularly, the present invention is directed to a power steering pulley removal tool including two halved capable of clamping on an annular pulley extension on the outer face of the pulley while a threaded drive bolt is compressed against the splined or non-splined drive shaft so as to pull the pulley off of the drive shaft.

BACKGROUND OF THE INVENTION

Power steering pumps are in wide use to provide for a power assist in the steering of motor vehicles. These pumps typically have a pump through which power steering fluid is pumped, the pump being driven by a drive belt which engages a pulley on the pump. The pulley is attached to the pump drive shaft either by splines formed on the exterior of the drive shaft and the interior of the pulley, or by a set screw which passes through the pulley and engages a non-splined shaft.

The present invention relates to the removal of pulleys from pumps having splined or non-splined drive shafts, in which event the pulley outer face has an axially disposed disc with an annular groove formed thereon, which is gripped by a pair of jaws to extract the pulley from the drive shaft as the drive bolt is rotated. The prior art devices used for this purpose have suffered from two principal deficiencies: the jaws have tended to separate under the extraction force, and the jaws have tended to rotate with the rotation of the drive bolt.

SUMMARY OF THE INVENTION

According to the present invention, a power steering pump pulley removal tool has a pair of jaws mounted by mounting fasteners on opposite faces of a hub which has a threaded passageway extending axially therethrough, the jaws being in longitudinal alignment with one another and the passageway, the jaws having complementary arcuate gripping elements formed thereon so as to be remote from the hub with a pair of laterally aligned grip-holding fasteners extending through one of the jaws adjacent its gripping element and engaging the other jaw adjacent to its gripping element, the hub having a handle extending laterally therefrom, and a complementarily threaded drive bolt disposed in the hub passageway and having a power steering pump drive shaft engaging end adjacent the jaw gripping elements and a drive end remote therefrom.

DETAILED DESCRIPTION OF THE PREFERRED EMBODIMENT

Figure 1:
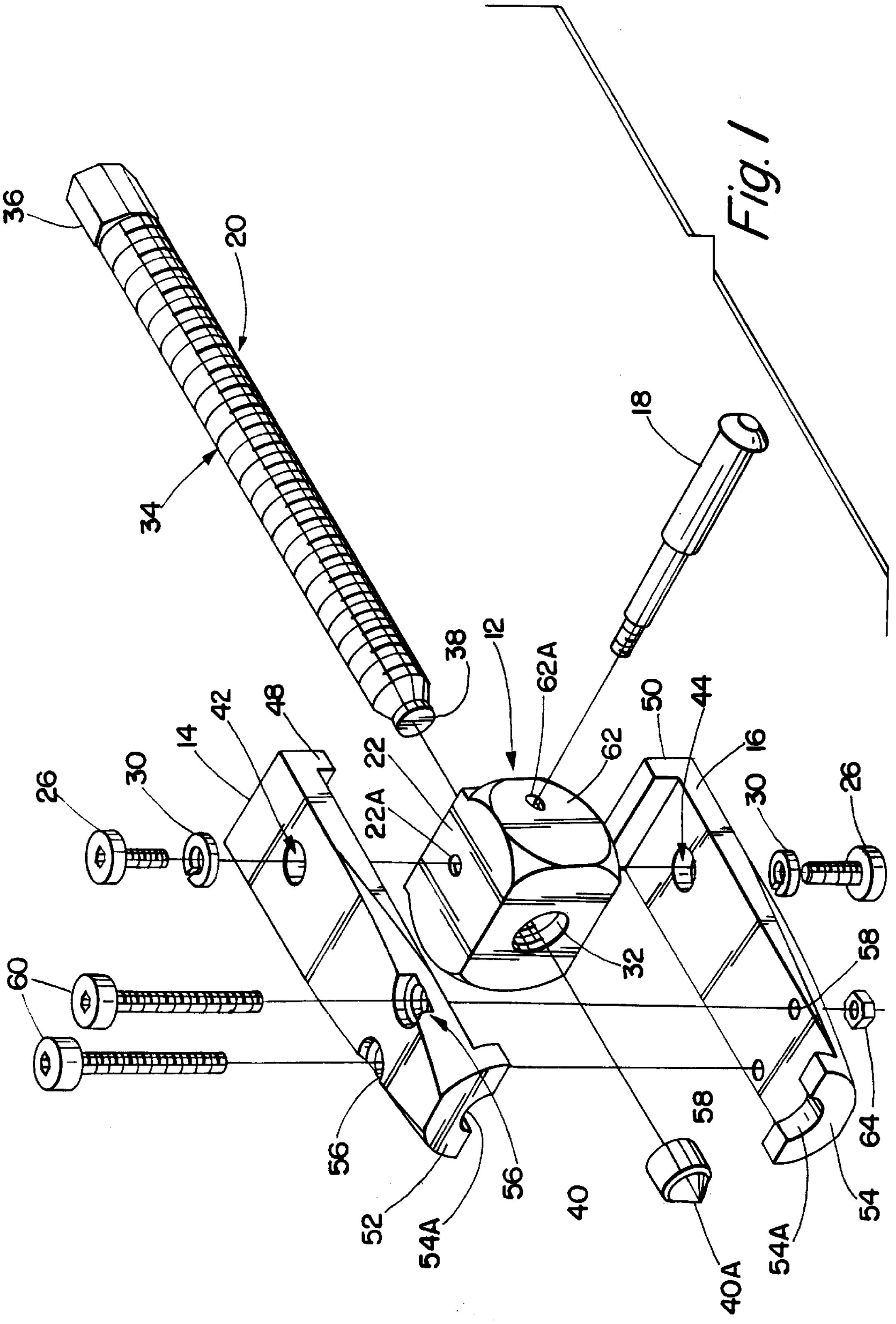
FIG. 1 is an exploded view, in perspective, of a power steering pump pulley removal tool according to the present invention.

In FIG. 1, a power steering pump pulley removal tool 10 is shown in exploded form as having a hub 12, a pair of jaws

14, 16, a handle 18, and a drive bolt 20. The jaws 14, 16 are mounted to upper and lower faces 22, 24 (see FIG. 2) of the hub 12 by mounting fasteners 26, 28, respectively. Each of the mounting fasteners 26, 28 has a lock washer 30 associated therewith, and threabaly engagr the hub 12 by threaded recesses 22A, 24A (see FIG. 2).

The hub 12 has a threaded passageway 32 extending therethrough. The drive bolt 12 has complementary threads 34 extending along the length thereof, and terminating in a drive end 36, shown as an octagonal cross-section drive element, and a shaft engaging end 38, onto which a conical shaft engaging cap 40 is disposed in the preferred embodiment. The shaft engaging cap 40 has a conical face 40A formed thereon to mate with a complementary recess formed on a pump drive shaft, when the removal tool is in use.

The jaws 14, 16 have apertures 42, 44, respectively, through which the mounting fasteners 26, 28 extend so as to threadably engage threaded recesses 22A, 24A (see FIG. 2) formed in the hub faces 22, 24, respectively. The jaws 14, 16 have rear shoulders 48, 50. The jaws 14, 16 have complementary arcuate gripping elements 52, 54, respectively, formed thereon remote from the shoulders 48, 50, and operable to engage the pulley to be removed. The gripping elements 52, 54 have central cut out portions 52A, 54A, extending longitudinally therethrough to permit passage of the drive bolt 20 therethrough.

The jaw 14 has a pair of laterally aligned apertures 56 (see FIG. 1) extending therethrough in vertical alignment with a pair of bores 58 formed in the jaw 16. A pair of grip holding fasteners 60 extend through the apertures 56 and the bores 58 and so as to engage a pair of nuts 64.

The handle 18 threadably engages either one of a pair of lateral faces 62 of the hub 12 by means of one of a pair of threaded recesses 62A formed one in each of the faces 62. The user may then select whether the handle 18 is to be gripped by the user's right hand or left hand.

Figure 2:
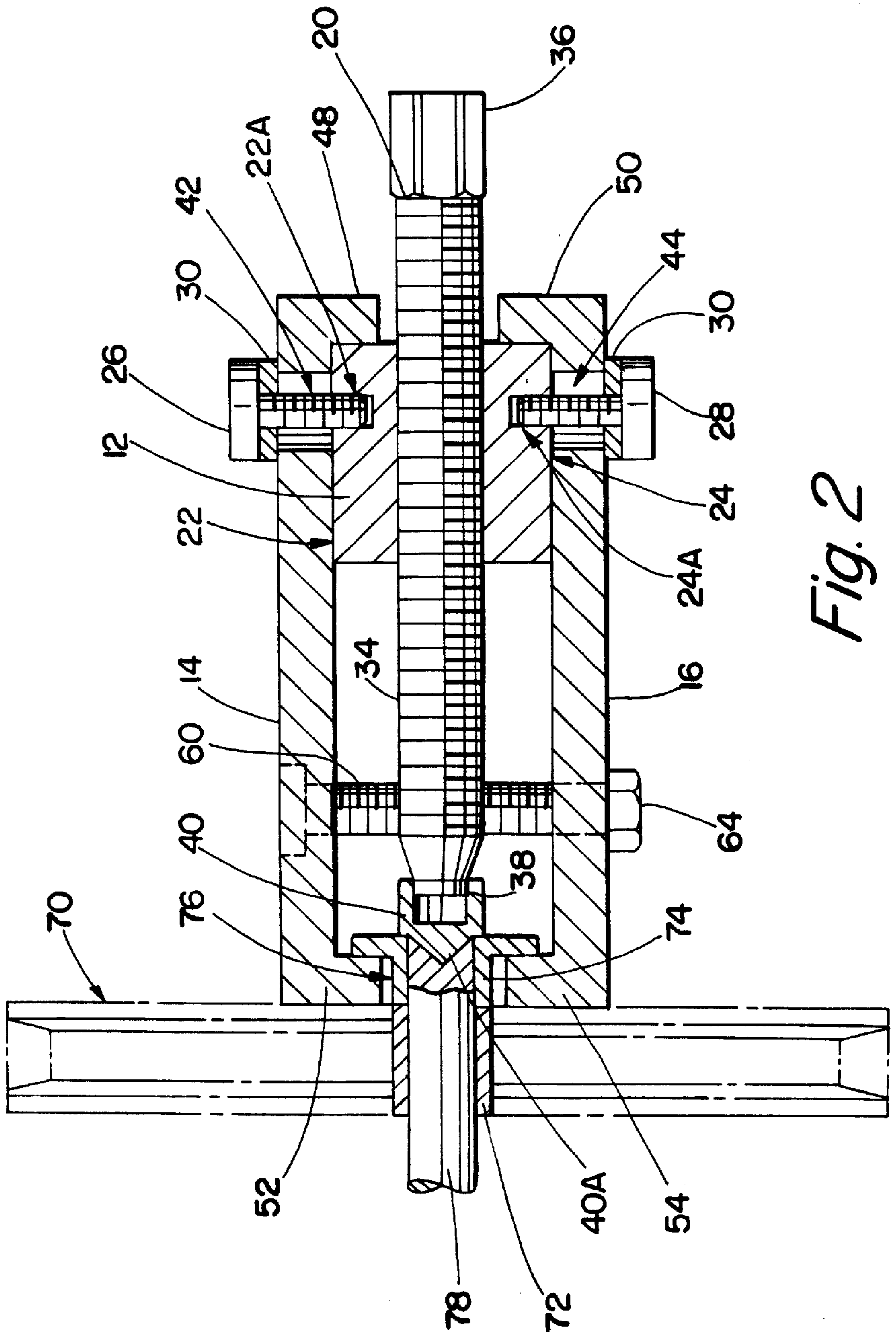
FIG. 2 is a side elevational view, in section, of the pulley removal tool of FIG. 1 in its assembled form and attached to a power steering pulley.

FIG. 2 is a side elevational view, in section, of the removal tool 10, showing the tool 10 attached to a power steering pump pulley 70, shown partially in section. The pulley 70 is mounted on a pulley hub 72, from which a disc 74 extends axially. The disc 74 has an annular groove 76 formed thereon, which is engaged by the gripping elements 52, 54. The pulley hub 72 is mounted on a splined or non-splined pump drive shaft 78 of a power steering pump (not shown, see FIG. 3). The removal tool gripping element 52, 54 are locked in engagement with the disc 74 by the grip holding fasteners 60, which have been tightened so as to prevent the gripping elements 52, 54 from opening away from one another under the influence of the pressure to be applied to the drive shaft 78 by the rotation of the drive bolt 20.

Figure 3:
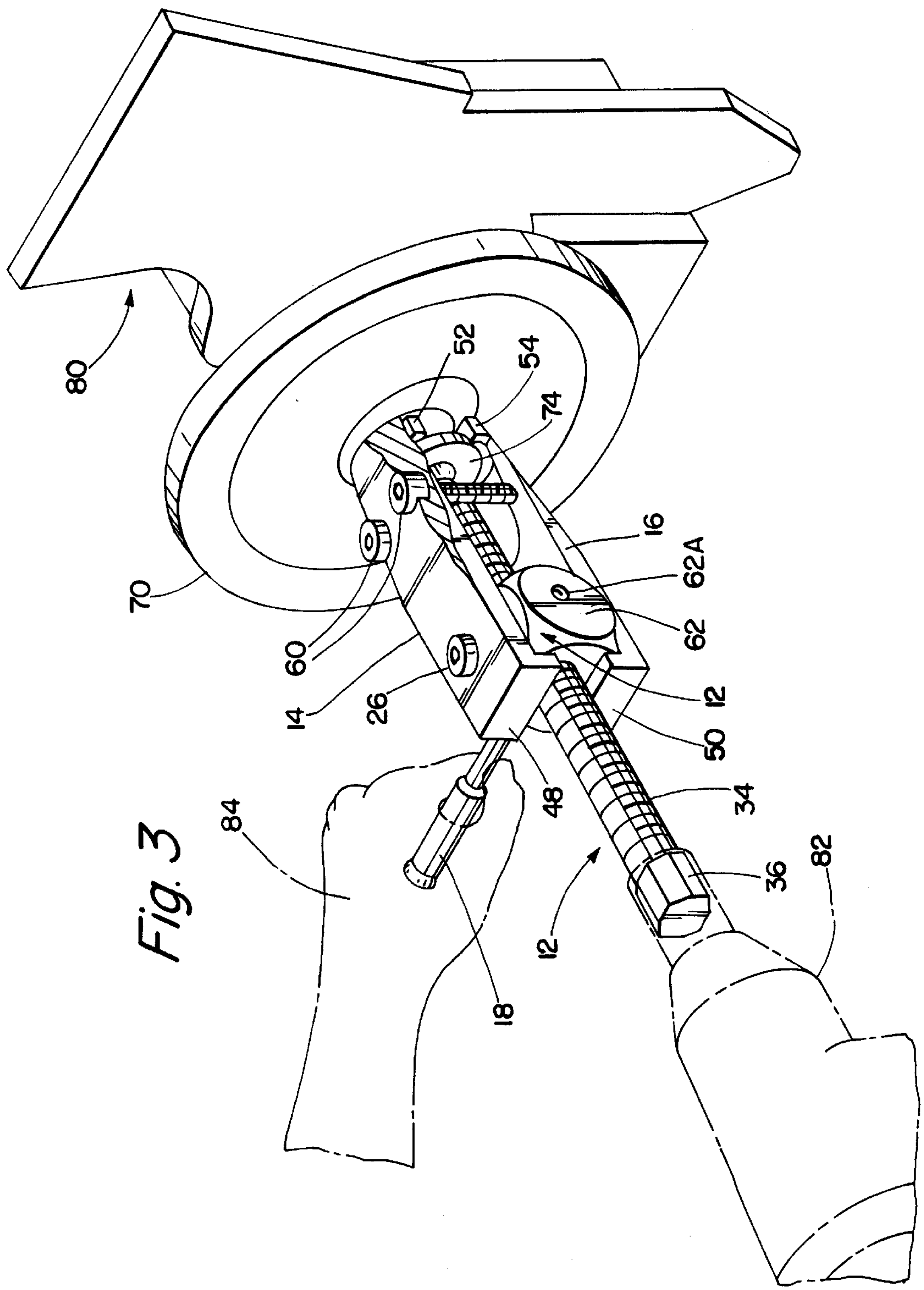
FIG. 3 is a view, in perspective, showing the pulley removal tool of FIG. 1 in the process of removing a power steering pump pulley from a power steering pump.

FIG. 3 is a view, in perspective and partially cut away, of the removal tool 10, illustrating its actual use. The pump pulley 70 is shown as being removed from a power steering pump 80 by the use of a compressed air driven wrench 82, shown in dotted lines, which engages the drive end 36 of the drive bolt 20, so as to rotated the bolt 20 in the hub 12, which is held against rotation by a user's hand 84, also shown in FIG. 3 in dotted lines as holding the handle 18. The rotation of the drive bolt causes the drive bolt to press against the pump drive shaft 78 (see FIG. 2), thereby pulling the pulley 70 from the shaft 72.

The presently preferred embodiment of the invention has been set forth herein in detail for illustrative purposes. Variations and modifications thereof, apparent to those skilled in the art, including the rearrangement and/or substitution of parts to provide equivalent structures, lie within the scope of the present invention, which is limited only by the following claims.

The invention claimed is:

1. A power steering pump pulley removal tool comprising:

a hub which has a threaded passageway extending axially therethrough;

a pair of jaws mounted by mounting fasteners on opposite faces of the hub, the jaws being in longitudinal alignment with one another and the passageway and having complementary arcuate gripping elements formed thereon so as to be remote from the hub;

a pair of laterally aligned grip-holding fastener means extending through the jaws adjacent their gripping elements and operable to hold the jaws in a selected closed pulley-engaging position;

a handle extending laterally outwardly from the hub; and a complementarily threaded drive bolt disposed in the hub passageway and having a power steering pump drive shaft engaging end adjacent the gripping elements and a drive end remote therefrom.

2. A removal tool according to claim 1, and in which the drive shaft engaging end includes a shaft engaging cap.

* * * * *